United States Patent [19]

Golden

[11] 4,344,350
[45] Aug. 17, 1982

[54] CROSSFEEDER

[75] Inventor: Michael D. Golden, Costa Mesa, Calif.

[73] Assignee: General Dynamics, Pomona Division, Pomona, Calif.

[21] Appl. No.: 93,727

[22] Filed: Nov. 13, 1979

[51] Int. Cl.³ ............................................. F41D 10/42
[52] U.S. Cl. .................... 89/33 E; 198/347; 198/594
[58] Field of Search ............ 89/33 BB, 33 E; 198/347, 594

[56] References Cited

U.S. PATENT DOCUMENTS

| | | | |
|---|---|---|---|
| 1,212,754 | 1/1917 | Fleischer . | |
| 1,893,746 | 1/1933 | Kantor . | |
| 2,608,133 | 8/1952 | Ransom et al. | 89/33 E |
| 2,874,701 | 2/1959 | Stelzer | 131/94 |
| 2,979,991 | 4/1961 | Buschers et al. | 89/1.5 R |
| 3,670,863 | 6/1972 | Meier et al. | 89/33 ML |
| 3,800,658 | 4/1974 | Hougland | 89/33 D |

FOREIGN PATENT DOCUMENTS

| | | | |
|---|---|---|---|
| 954896 | 1/1950 | France | 89/33 E |
| 539855 | 9/1941 | United Kingdom | 89/33 E |

Primary Examiner—Stephen C. Bentley
Attorney, Agent, or Firm—Henry M. Bissell; Edward B. Johnson

[57] ABSTRACT

An apparatus for feeding a plurality of items to a unit having a variable demand. The apparatus includes a frame rotatably supporting a first shaft in a fixed position, and a last shaft rotatably supported in a fixed position, the last shaft supplying items to the unit, the first shaft discharging the items from the apparatus at a variable rate, and at least two rotatable pivotally mounted, intermediate shafts to guide the items between the first and last shafts and accumulate them during load demand. The rate of feed by the last shaft is different from that of the first shaft and is determined at least by the extent of accumulation at the intermediate shafts, and optionally also by the differential in feed rate existing between the first and last shafts.

30 Claims, 6 Drawing Figures

CROSSFEEDER

BACKGROUND OF THE INVENTION

1. Field of the Invention

The present invention relates to a crossfeeder for accumulating and conveying items to a variable demand unit. More particularly, the present invention relates to an apparatus for supplying shells to a gun firing in an intermittent rapid fire mode by accumulating shells in a crossfeeding apparatus in order to accommodate variations in the gun's firing rate, and start-up and shut-down conditions.

2. Background of the Prior Art

Many different systems and equipment designs have been employed in the prior art for providing articles to a particular utilization point in a sequential manner. For example, cigarettes are manufactured by processes involving movement of individual cigarettes, or of an article that is to be eventually cut in half to form two cigarettes. The canning and bottling industries also move cans and bottles along some form of assembly line and, for instance, fill and seal a container at separate stations. In the military, armament has developed to the stage where rapid fire guns are in common use, and thus numerous designs have been proposed for the storage and transportation of shells to the gun.

All of these feed systems have a relatively common problem; namely, supplying shells to the guns in precise synchronization with gun demand. This problem is relatively easy when dealing with externally powered guns. In this type of gun, the feed system and gun are usually geared directly together and any convenient external power source may be used. Furthermore, these guns usually accelerate smoothly to full firing rate over a period of about 0.05 seconds, and the rate usually does not vary except during this start-up period.

Self powered guns present more difficult problems, as they actually start and stop once for every shell fired, regardless of the rate of fire. They start up and shut down almost instantly and are generally not capable of supplying enough excess power to drive a feed system. Thus, an auxiliary power source must be employed to drive the feed system, and it must be synchronized with the gun demand. It is also necessary to provide shell accumulation capacity between the gun and the majority of the shells stored by the feed system, as it is not practical to keep the entire complement of shells moving in synchronization with the gun.

In the cigarette industry, Stelzer in U.S. Pat. No. 2,874,701 proposes a double feeding system utilizing a first wheel to position cigarette filters and to feed a second wheel, and a feed on the second wheel to provide rolled tobacco at either end of the filter. The filter and cigarette units are combined, and then passed to a third wheel, wrapped, and eventually severed into individual cigarettes and packaged. This type of unit, however, utilizes nothing more than a gravity flow funnel type of feed system in order to supply the tobacco and the filter to the appropriate wheel. Thus it is inherently limited in speed, as the feeding can only be effected at the speed at which the slower of the two units falls into place. Additionally, there is no positive feed of either component, and a gravity feed system inherently has problems with jamming.

In the bottling and can filling industry, J. Kantor in U.S. Pat. No. 1,893,746 discloses a system that utilizes a star wheel to rotate bottles through the steps necessary to process them. An indexing system is provided in order to prevent damage to the system due to variations in bottle sizes and inaccuracies in indexing. However, like the prior disclosure, Kantor does not overcome supply and operation speed variation problems. In another system, P. W. Fleischer in U.S. Pat. No. 1,212,754 utilizes two separate gears in order to space cans apart even further and to speed them up. Again, however, the possibilities of accumulating cans to respond to variations in need is not addressed.

Meier et al. in U.S. Pat. No. 3,670,863 discloses a cartridge delivery system formed of an endless conveyor with individual "clam shell" cartridge holders that are maintained in a closed position during cartridge conveyance and open for cartridge release during rotation around an independent guide. The system, however, does not allow for accumulation of extra cartridges except in the flexibility of the conveyor, which is limited by the structure necessary to hold the clam shells closed.

Another system, described by Buschers et al. in U.S. Pat. No. 2,979,991, fires projectiles laterally to the direction of travel of an airplane using a Gatling gun type of system, and provides the projectiles to the system in pairs, one for firing in each direction, through the use of a chain ladder. The projectiles are guided into position by using pivoted shoes. The rate of firing of the gun, like the other known systems, is controlled by the shell delivery rate from the magazine, as no independent means are provided for accumulation between the magazine and the gun itself.

U.S. Pat. No. 3,800,658 of Hougland et al. takes a different approach and provides a drum type of ammunition storage system, eliminating the need for sprockets and scoop disc assemblies. This system serves to accelerate the speed of only the last few shells before firing, and to produce part of the acceleration by combining two different trains of shells. This type of system would overcome some of the surge problems noted above but, again, would not allow for automatic variable accumulation and storage which can provide greater flexibility in firing rates.

SUMMARY OF THE INVENTION

The present invention will be described in terms of a crossfeeder, or feeding unit, for a self-powered automatic gun, such as is used for anti-aircraft defense. However, it is also applicable to positive high speed mechanical feed of other items of uniform size and shape, such as from a supply source feeding at a quasi-steady rate to a demand point operating at a start-stop variable rate. An example of such is the commercial canning and bottling industry, as well as other fabrication and production processes requiring high speed feed and orientation of items of uniform shape and size.

In arrangements of the present invention as described herein, a support structure is attached to the side feed area of a 35 mm gas-operated, rapid fire cannon which has integral with it an indexing feed rotor and shell locating structure generally found in such weapons. The gun feed rotor is powered by the gun and indexes (e.g. 60 degrees for a 6-position rotor) for each shell fired.

The support structure supports a rotatable first shaft, which is caused to rotate in unison with the gun feed rotor by means of a conveyor belt which circulates around the gun feed rotor and the first shaft. The design of the conveyor elements or buckets depends on the use. They are usually designed to convey specific shells into the gun. Power to the first shaft is transmitted through a pair of sprockets keyed to the shaft and driven by the circulating conveyor elements.

At the shell feed end of the crossfeeder, a fixed position, rotatable outside shaft is provided. It is driven by a booster motor, either directly or indirectly, which provides the external power. At least two further rotatable shafts are interposed between the first and the outside shafts, and a positive gear train is provided between adjacent shafts for synchronous rotation. However, unlike the first shaft and the outside shaft, the intermediate shafts are not fixed in position but are pivotally positioned so that the shaft adjacent the first shaft may pivot about the first shaft within certain limits and the other intermediate shaft, adjacent the outside shaft, may pivot about the outside shaft.

Each of the shafts has plural positioning rotors or sprockets which are synchronized to each other by the meshing of the gear train, and these rotors interface with and control the movement of the 35 mm shells. The angle defined by lines drawn to the first shaft and to the second intermediate shaft, from the first intermediate shaft, is utilized to activate operation of the booster motor on the outside shaft, and provide shells to the crossfeeder unit. In operation, the linkage geometry allows the structure to assume a position which varies between maximum accumulation, where the intermediate shafts are positioned so that the outer intermediate shaft is below the inner intermediate shaft and a minimum accumulation state where the positions of the intermediate shafts are reversed. Utilizing four shafts and five positions on the rotors on each shaft, the differential in accumulation is about four rounds.

Even with this differential in accumulation, complete mechanical control over each round is maintained at all times by overlapping guides, and a positive drive train between all of the shafts is produced by the spur gears. Additionally, in this form, the crossfeeder is reversible, and thus cartridges can be backed out of the system with a mere reversal of the booster motor which would then drive all of the gears and the rotors in reverse.

Normal operation of the crossfeeder commences with all of the system at rest and the crossfeeder at or near its maximum accumulation state. The boost motor is not active or driving, but the motor and its attached shaft are capable of free wheeling. When a demand begins, the crossfeeder is made operational by the motion of the gun feed rotor, and thus rotation of the first shaft. This rotation tends to move the inner intermediate shaft, as the two are connected by spur gears. Since there is no drive from the booster motor, the inner intermediate shaft tends to revolve about its pivot in order to continue feeding shells. The motion of the inner intermediate shaft is sensed by the control unit, and the booster motor is actuated initiating motion of the outside shaft, and feed of shells to the crossfeeder from the external supply. There is a slight time delay—in the system described herein approximately one-tenth of a second—before supplying at the outside shaft is initiated after gun demand is initiated. This time should be considerably less than the amount of time it takes for the crossfeeder to reach the minimum accumulation state as additional time is required for the external supply feed rate to reach the gun demand rate. Once the drive begins the crossfeeder is then provided with additional rounds, and tends to move back to the full accumulation state when the supply rate of the crossfeeder exceeds the gun demand rate. In the preferred form, the drive begins approximately when the crossfeeder passes the midpoint of accumulation. And thus, as it is driven back towards full accumulation, at its midpoint the booster motor is commanded back to its coast condition by the operational signal sensed from the angular position noted above. The result is that the crossfeeder "dithers" about the accumulation midpoint; that is, the motor is commanded back and forth between the drive and coast conditions, as required, to meet the demand requirements. When demand ceases, the supply will continue for a short period of time due to inertia, and the system will run back to the full accumulation state, ready for a new round of firing. In order to secure the system, the full accumulation condition is sensed as it is approached, and the motor is commanded into a brake or reverse condition and returns to rest at its maximum accumulation state.

In operation, for example, the unit described in the drawings attached hereto functions by the inner shaft advancing 72 degrees (one fifth of a full rotation) approximately every 0.085 seconds, rests for 0.015 seconds, and then advances another 72 degrees, and continues this operation so long as the demand is maintained. In this manner, a shell is fed to the gun every 0.10 seconds, but this rate is variable, depending upon the gun's demand. Due to inertia and the characteristics of the hydraulic motor, however, the outer shaft essentially rotates on an almost continuous basis with power being provided as needed. Thus, a system with an almost continuous input during demand but with a variable rate and time delayed output is provided.

Although the design may vary these factors, most of the power to the unit is provided by the booster motor, and only a small amount of the power is transmitted from the inner shaft. Most of this power, of course, is utilized in the pivoting of the inner intermediate shaft. However, direct power input to the supply point from the demand point may be provided if the demand point is capable of supplying significant power. For example, some power could be provided by utilization of the exhaust gases in the cannon. This supplying could be accomplished by adding a simple spring loading system to the crossfeeder, and a optional shock absorbing system. In this form the intermediate shafts would be preloaded and biased towards the maximum accumulation state. The result would then be that the shafts would tend to pull toward maximum accumulation, while demand to the first shaft would tend to work against the spring bias, and the power provided to the first shaft would overcome this bias. Should sufficient power exist at the demand point, then the booster motor could be eliminated in this form; however, all of the other features including the positive mechanical control, synchronization, and reversibility, would remain unchanged.

In the system described, four shafts, each having five-position rotors, is described. However, more shafts and linkages could be provided and with a different number of rotor positions or sprocket designs. These factors would be determined by the amount of accumulation desired, and the particular size of the item to be fed. The accumulation capacity of the crossfeeder is roughly proportional to the number of shafts multiplied by the number of rotor positions. However, each added shaft will add an additional degree of freedom to the linkage, and stops or other retaining means may be utilized to limit the system geometry at a selected point or eliminated.

The sensor unit contemplated to control the activity of the crossfeeder is disclosed herein as a mechanical/electronic unit. However, it could easily be fluidic, optical, or even totally mechanical. Also, depending on whether the unit is designed as part of a total package, or designed as an addition to existing equipment, various changes in the drive and gearing arrangements could be appropriate. For example, electrical power or spring biasing could be used; the unit could be "force fed" from an external source that has limited power capabilities; or the unit could be driven by converting the exhaust gases of the gun into usable power. Finally, the first shaft could be positioned to act as the actual shell loading mechanism at the gun's breech, and thus the arrangement of the conveyor element system would be different.

BRIEF DESCRIPTION OF THE DRAWINGS

A better understanding of the present invention may be had from a consideration of the following detailed description, taken in conjunction with the accompanying drawings in which.

DESCRIPTION OF THE PREFERRED EMBODIMENTS

Figure 1:
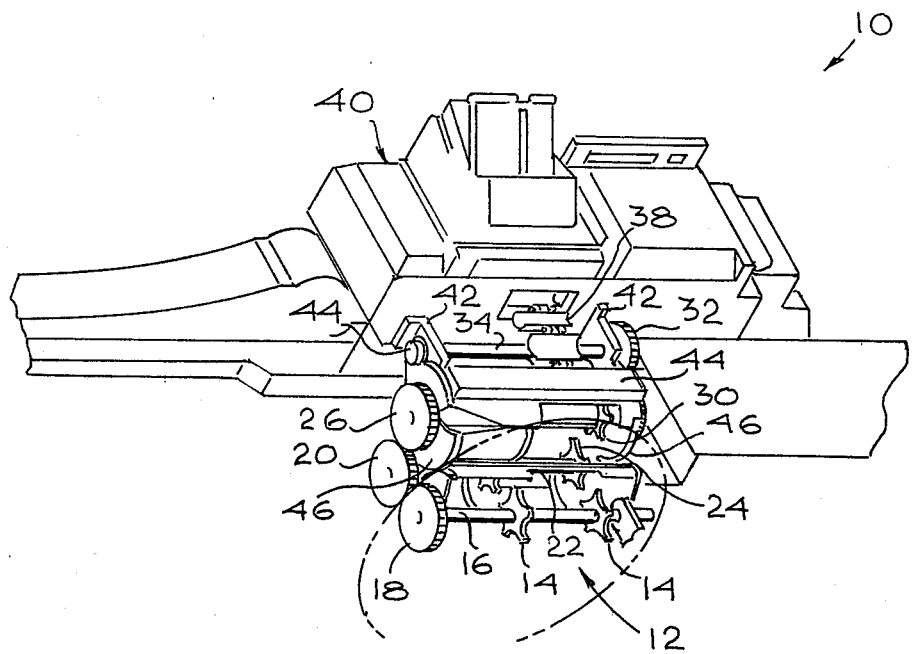
FIG. 1 is a perspective view generally showing the crossfeeder of the present invention without its support structure.

In FIG. 1, a 35 mm cannon is indicated generally at 10, and the feed to the crossfeeder is provided, for instance, by a transfer unit indicated generally as 12, in phantom. The shells or cartridges are guided to the top of sprockets 14 on the outside (fourth) shaft 16 which is driven by a hydraulic motor, not shown, and is also provided with gear 18 which meshes with gear 20 to drive third shaft 22 and sprockets 24 mounted thereon. Gear 20 is also meshed with second shaft gear 26 which drives a second shaft (not shown) and related sprockets 30. The second shaft also has a spur gear mounted at the end opposite gear 26, which is mated to first shaft gear 32, attached to first shaft 34. First shaft 34 is provided with sprockets (not shown) for conveyor elements 38. The conveyor elements supply the shells to the gun, and are returned empty to the crossfeeder, as shown. The whole crossfeeder is attached to gun housing 40 by brackets 42 which also position first shaft 32 and pivotal guide 44. Pivotal guide 44 is used to locate second shaft 28, and the crossfeeder is provided with further pivotal guides 46 at either end of second shaft 28 which position third shaft 22 in a pivotal relationship to second shaft 28, and guide the cartridges. Fourth shaft 16 also is provided with related pivotal guide 48 which pivotally interconnects fourth shaft 16, and third shaft 22. In operation then the cartridges are picked up in the upper portion of guide 48, and transported by sprockets 14 toward the gun, and in an upward direction. They then contact pivotal guide 46 for transporting from the third shaft to the second shaft and thereafter are transported through pivotal guide 44 to the point where they are picked up by conveyor elements 38 and transported into gun 10.

Figure 2:
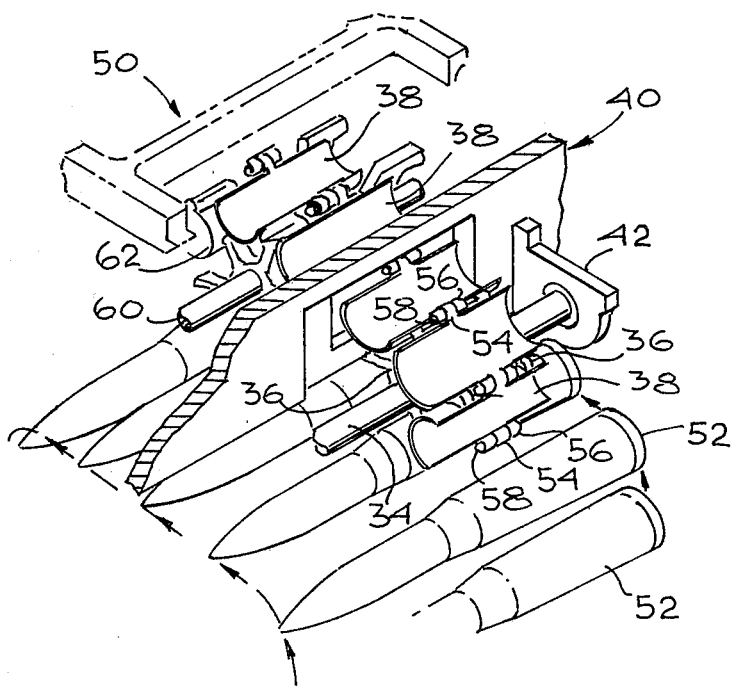
FIG. 2 is a detail of the exit area of the crossfeeder of FIG. 1.

In FIG. 2, the inner structure of the gun is shown in section at 50 with gun housing 40 spaced away from the remaining portions for clarity. In the drawing, cartridges 52 are transported in the direction of the arrows at the tip and base thereof, through the crossfeeder until they contact conveyor elements 38, are positively engaged therewith, and enter the gun through an aperture in housing 40. Conveyor elements 38 are interconnected through related flanges 54 and 56, provided on opposite sides of each conveyor element with the conveyor elements pivotally joined at 58. First shaft 34 has a pair of sprockets 36 mounted thereon which are designed and spaced in such a manner that they contact and guide conveyor elements 36 during operation.

The conveyor elements form an endless loop and, inside housing 40, a loading shaft 60 is provided with gun feed rotor 62. The first shaft and the loading shaft cooperate to transport the conveyor elements from the crossfeeder to gun loading station. Loading is usually effected by a gas operation in which pressure is tapped off the barrel of the gun, and utilized to operate the spent cartridge discharge and fresh cartridge loading functions through a series of pistons. It should be noted that the loading operation is not continuous, but occurs in a pattern, related to the rapidity of firing, and thus loading shaft 60, conveyor elements 38, and first shaft 34, as described above, index each time a cartridge is physically loaded. They do not operate between loading steps. Also, guides and lower positioning structures are often provided below the cartridges. In the alternative, conveyor elements 38 may be of the clam shell type, which open to receive or discharge a cartridge as a result of the curvature produced by passing the endless conveyor element chain over a set of sprockets. Other transfer mechanisms for the endless conveyor element chain can be utilized, the selection and design of the particular conveyor element system depending upon the gun being utilized.

Figure 3:
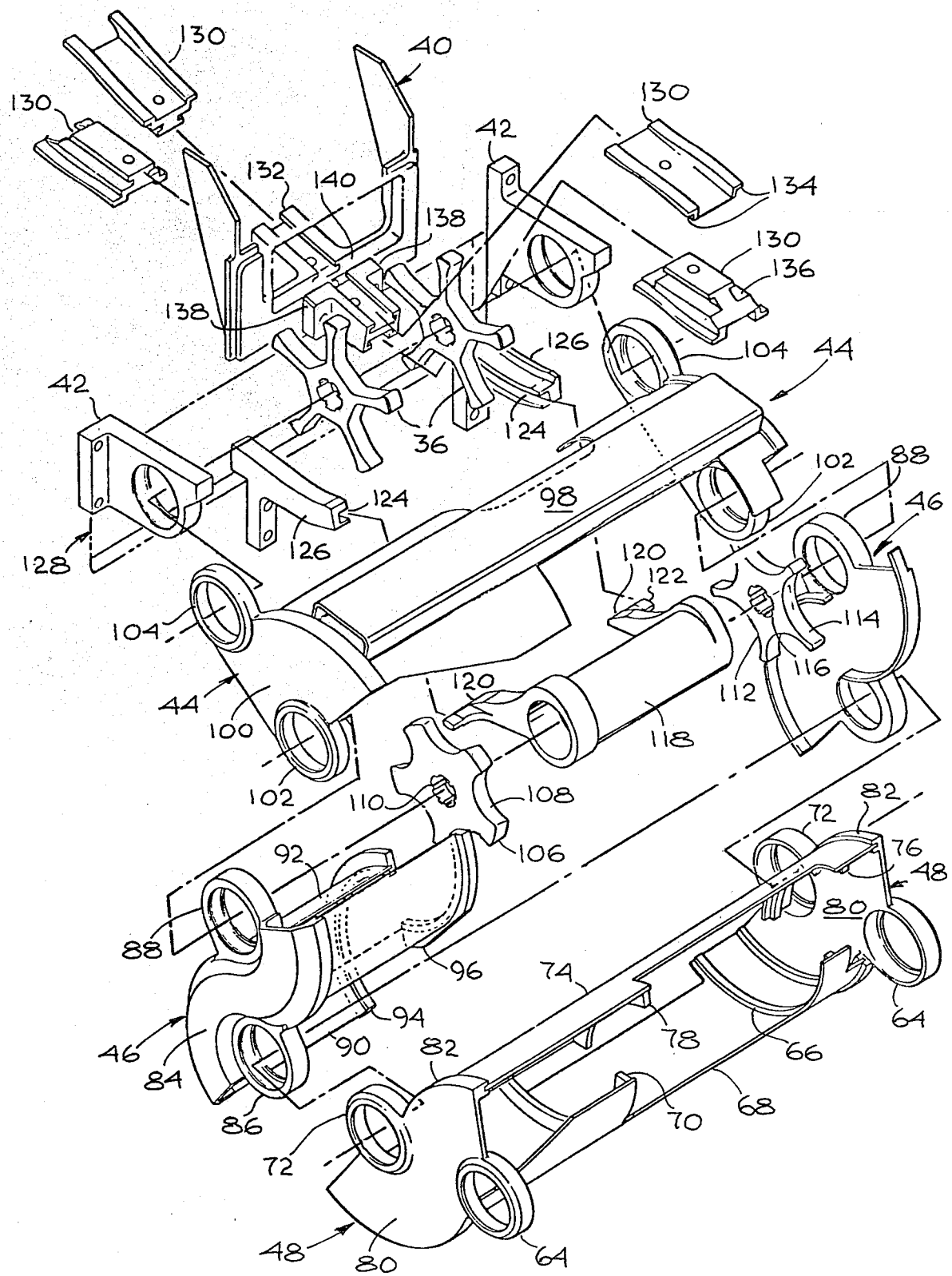
FIG. 3 is an exploded view of the crossfeeder.

The exploded view in FIG. 3, showing the particular guide structures, sprocket system and related pieces, details the path of the cartridges through the crossfeeder. Pivotal guide 48 includes fourth shaft mounting rings 64 positioned such that the cartridge passes above the shaft and enters the unit, the base diameter of the cartridge being guided by ridges 66 formed in lower section 68 and the neck diameter of the cartridge being guided by lip 70. Rings 72 are provided for rotational mounting of the third shaft, and upper section 74 is also provided with a ridge 76 to position the base of the cartridge, and lip 78 to position and guide the neck. In manufacture, end plates 80 are essentially mirror images, and are provided with rings 64 and 72 for the mounting of the shafts and, in addition, with channelled extensions 82 designed to receive lower guide section 68 and upper guide section 74. Due to the geometry of the system, that is, since the shells pass above rings 64 and then around rings 72, upper section 74 is constructed in a manner that it curves downward and guides the shell into an engagable position with relationship to the sprockets which are not shown. The central sections of the guides between the second and third shafts, and the first and second shafts are not shown in as much detail, but are constructed such that they mate with, and have essentially the same rigid lip type of structures described above, in order to continue the guiding of the cartridge through the crossfeeder.

Guide 46 is provided with end plates 84 having third shaft mounting rings 86 and second shaft mounting rings 88. As noted above, forward end plate 84 is provided with channelled extensions for upper central section 92 and lower central section 90. The forward end plate has the same neck guides formed therein, shown as 94 and 96 for the lower and upper central sections respectively. Base diameter guidance is supplied by the two integral lips of aft end plate 84. Lower central section 90 is larger than upper central section 92 since the shell is traversing around the third shaft and to the second shaft, and thus travels outside of a line which would intersect each of the four shafts. The cartridge, after passing through the space between the second and third shafts then travels around the outside of the second shaft, and as a result, the upper central section 98 of guide 44 is longer than the lower one, if a lower section is provided. Guide 44 has end plates 100 and related rings 102 for the second shaft and 104 for the first shaft. Rings 104 are positioned around the first shaft which is located on flanges 42. Flanges 42 are attached to the crossfeeder housing (not shown) or directly to gun housing 40. In this manner the second shaft revolves about the first shaft, at a distance defined by the gearing.

In the drawing, the section dealing with the section shaft is used to depict the arrangement of the sprockets, and the arrangement is essentially the same elsewhere in the unit. Forward sprocket 106 is provided with five circular shell case engaging surfaces 108 and splined surface 110 for contacting and positioning the shaft, not shown. Base sprocket 112 is also provided with circular surfaces 114 to engage the shell case, and splined surface 116 to engage the shaft (not shown). The splined surface, of course, would mate with the shaft, and thus the sprockets would rotate with the shaft. The shell projectile and casing engaging surfaces are circular in order to provide for the proper engagement of the surface with the shell during rotation which produces the motion of the shell through the crossfeeder. Finally, shell guide 118 is positioned between sprockets 106 and 112, and rotatably surrounds the shaft by virtue of the provision of a hole therethrough. At either end of the shell guide, arms 120 are provided and contain contact surfaces 122 which are slideably engaged with channels 124 in projecting arms 126. Projecting arms 126 are attached to the crossfeeder housing 128. Channels 124 protrude from the plane of crossfeeder housing 128 and are curved an appropriate amount so that the motion of the second shaft, about the pivot produced by rings 104 being mounted on the first shaft, is accounted for.

It is to be understood that the design of shell guide 118 is determined by the requirements such as envelope restrictions present at the output side of the crossfeeder. Shell guide 118 and projecting arms 126 may be eliminated in many applications where the envelope is less restrictive. In this event a lower section would be provided on guide 44, along with an additional fixed guide located integral with the gun.

The first shaft has splined sprockets 36 mounted to it, which form the carriers for the conveyor elements, not shown. The conveyor elements are rotated about the two shafts, as previously discussed, by the use of slideable tracks 130 positioned in mount 132. The tracks individually guide the conveyor elements through track lips 134, and attached to mount 132 through smaller lower lips or extensions 136. In the drawing, four separate tracks are shown which are located on mount 132, as indicated by the broken line for each. Outboard mount 132, external to housing 40, is attached to the housing by flange 138, and extends only a short distance so that each conveyor element is engaged by sprockets 36 before being removed from the track. The conveyor element then passes around the sprocket as the shaft is rotated and reengages track 132 on the lower channel portion thereof. In order for entrance and egress of the conveyor elements, the housings are provided with apertures. Indentation 140 is further, provided for proper mounting of track 130. Inside housing 40 of the gun, the track continues and is attached to the mount in the same manner as the outside portion, thereof. The unloading function at the gun loading shaft is described in more detail hereinabove.

Figure 4:
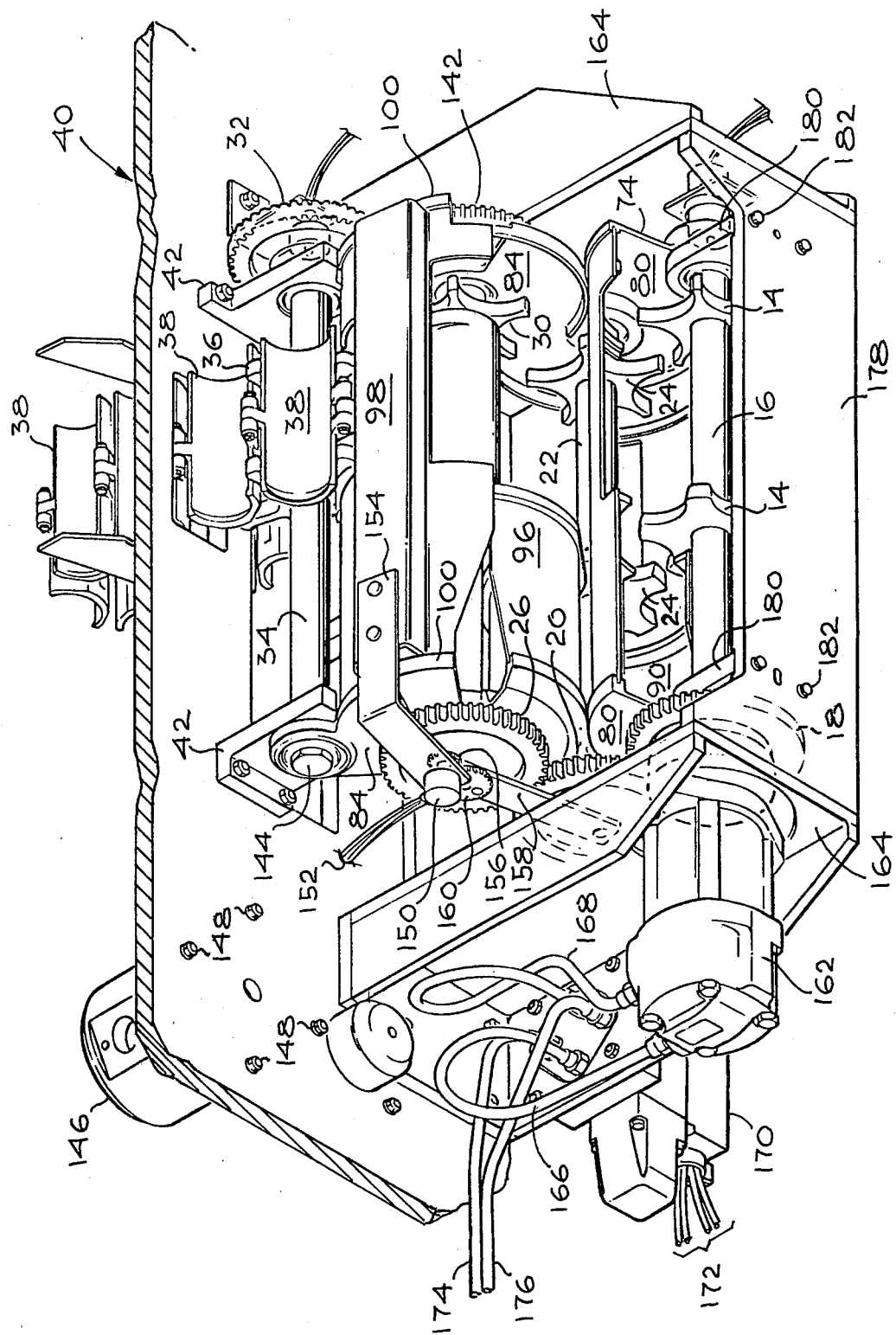
FIG. 4 is an isometric view of an assembled crossfeeder.

In the detail section shown in FIG. 4, projectiles are moved by sprockets 14 on fourth shaft 16 into the guide channel, shown as 74 and 80, and traverse down through the guide channel to contact sprockets 24 on third shaft 22. They are then brought around and through channels 90 and 96, traverse through the channel and upward to contact second shaft sprockets 30, one of which is shown, while being longitudinally constrained by end plates 84. Each cartridge is then rotated over the top of the second shaft, being guided by upper central guide section 98, and contacts conveyor element 38 below first shaft 34. It is then engaged by conveyor element 38 for entry into the chamber of the gun, not shown. First shaft gear 32 is driven by first shaft 34, which is rotated by the motion of the conveyor element arrangement. Gear 32 is meshed with second shaft spur gear 142, and during operation, the second shaft moves up and down about an axis defined by the gear train and the pivoting function of end plates 100 positioned around first shaft 34 by bolt 144. Shaft 34 is positioned, as noted before, by flanges 42 attached to housing 40. Housing 40 is also provided with trunnion mount 146 and through bolts 148 in order to accurately position the crossfeeder structure. The indexing or ratcheting motion of conveyor elements 38 while feeding the gun causes the second shaft to swing about shaft 34 due to the motion of gear 32. This angular motion is sensed by transducer 150 and conveyed to a control unit, not shown by lines 152. As can be seen transducer 150 is mounted off center through arm 154 to central upper guide section 98. The shaft of the transducer, not shown, is connected to gear 156, which is meshed with gear 160 which is concentric with the second shaft. However, gear 160 is mounted to bracket 158 which in turn is mounted to both the second and third shafts. Thus the transducer senses the angle between the first, second and third shafts and provides an input to the control unit to actuate the drive of the unit. Motion of the second shaft is transmitted to the third shaft through gears 20 and 26. Thus, there is positive mechanical and pivotal contact maintained between the first, second and third shafts, in the respective gear trains. In addition, third shaft spur gear 20 is meshed with fourth shaft gear 18, and driven thereby when hydraulic motor 162 is actuated. Hydraulic motor 162 drives the end of the fourth shaft by conventional means, and is mounted to channel shaped mounting structure 164. The mounting structure is provided on both sides of the crossfeeder to provide the appropriated framework for the unit. Hydraulic motor 162 is provided with fluid lines 166 and 168. Hydraulic pressure is provided by control valve 170 which is operated by signals from the controller, not shown, through electric lines 172, the valve being bolted to channel-shaped frame 164, as shown, but may be mounted at any convenient location or position. Pressure supply line 174 and return line 176 provide input hydraulic power. Channel-shaped side portions 164 of the frame are joined at their outer ends by central support assembly 178, which is also provided with mounts 182 for fourth shaft support members 180. The whole of the unit may be covered by a housing, if needed, in order to protect it during use in open situations, etc.

Figure 5:
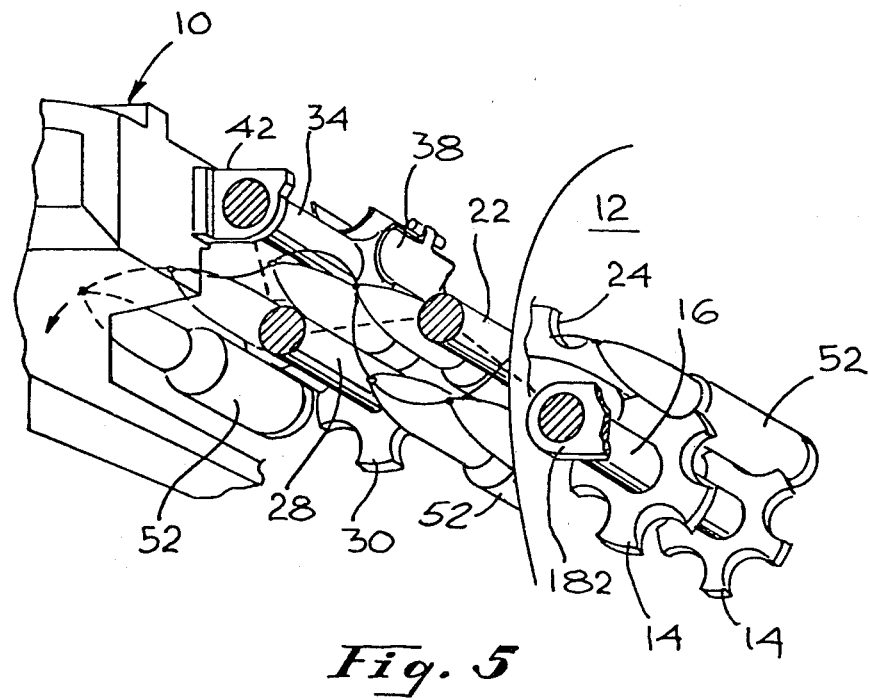
FIG. 5 is a schematic showing minimum accumulation of shells.
Figure 6:
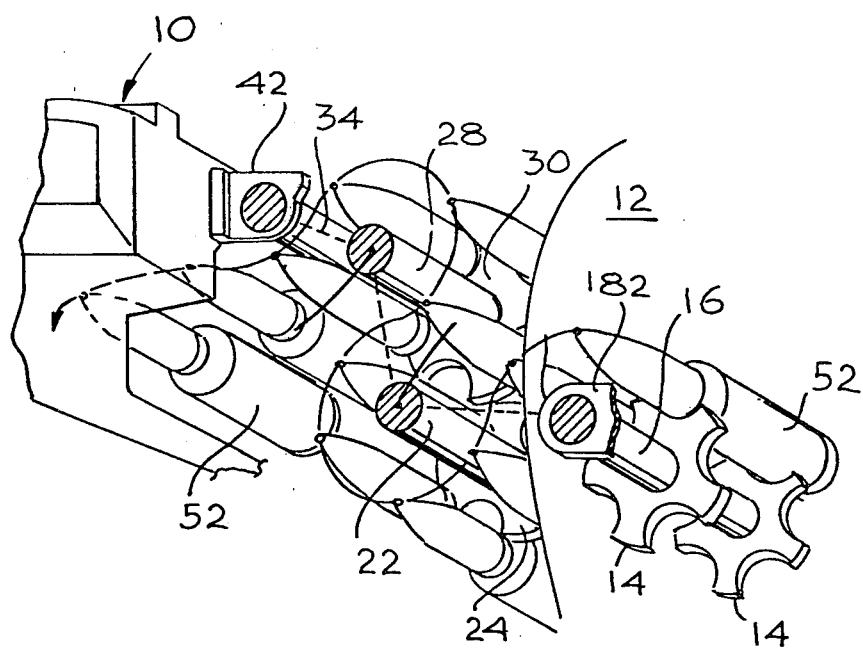
FIG. 6 is a schematic showing maximum accumulation of shells.

FIGS. 5 and 6 are provided in order to show the crossfeeder in the stages of maximum and minimum accumulation, in schematic form. In FIG. 5, the minimum accumulation state, gun 10 positions first shaft 34 through bracket 42. First shaft 34 has sprockets, not shown, which position conveyor elements 38 to hold projectiles 52. Second shaft 28 has sprockets 30 which guide projectiles 52 to first shaft 34. Third shaft 22, through sprockets 24 and guides, not shown, guides projectiles 52 to second shaft 28. Finally, fourth shaft 16, mounted to the frame assembly by bracket 182, has sprockets 14 for guiding shells 52 out of transfer unit 12 and to third shaft 22. The same functions occur in FIG. 6.

The difference, as can be seen by considering both figures at the same time, is that in the minimum accumulation state shaft 28 is rotated relatively downward, and third shaft 22 is rotated relatively upward by the function of the drive train as previously discussed. In the maximum accumulation state, on the other hand, second shaft 28 is rotated upward to its maximum point, as controlled by the guides, previously discussed, and third shaft 22 is rotated downwardly. The result, of course, is that more shells or projectiles 52 are provided in the maximum accumulation state.

Although there have been described above specific arrangements of a crossfeeder in accordance with the invention for the purpose of illustrating the manner in which the invention may be used to advantage, it will be appreciated that the invention is not limited thereto. For example, although the invention has been disclosed in the context of association with a 35 mm cannon, the principles of the invention are equally applicable to the bottling art, the canning art, and like. Accordingly, any and all modifications, variations or equivalent arrangements which may occur to those skilled in the art should be considered to be within the scope of the invention as defined in the appended claims.

What is claimed is:

1. A crossfeeder unit capable of constant supply rate and variable output rate of serially provided items comprising:
   a support structure;
   discharge means for discharging items from the unit;
   input means means for item input to the unit;
   intermediate means for accumulation of a variable number of items between the input and discharge means, the intermediate means including at least one pivotable accumulating means mounted to pivot about the axis of at least one of the input and discharge means in accordance with differences between the supply rate and the output rate;
   guide means for guiding said items from the input means to the output means via the intermediate means; and
   control means responsive to the position of the accumulating means relative to the pivot axis and effective to control the feed of items to said crossfeeder.

2. The apparatus of claim 1 further comprising drive means interconnected between said control means and the input means.

3. The apparatus of claim 2 wherein said drive means is hydraulic.

4. The apparatus of claim 1 further comprising gear means interconnecting the input, intermediate and discharge means, effective to drive said intermediate means.

5. The apparatus of claim 1 further comprising item conveying means positioned adjacent said discharge means, and effective to remove said items from said crossfeeder.

6. The apparatus of claim 1 wherein the intermediate means comprises a plurality of pivotable and rotatable shafts and includes item moving means thereon effective to transport said items through said intermediate means.

7. The apparatus of claim 6 wherein the number of shafts is two.

8. The apparatus of claim 6 wherein the pivotable and rotatable shafts of the intermediate means are respectively pivotable about the input means and the discharge means and wherein the intermediate means accumulates items by the pivoting of the shafts away from a line between the input and discharge means.

9. The apparatus of claim 8 including means for driving the discharge means prior to driving the input means in order to withdraw items accumulated in the intermediate means.

10. The apparatus of claim 2 further including means for sensing the rotation of the discharge means to cause the drive means to initiate rotation of the input means after a predetermined delay following the initiation of rotation of the discharge means.

11. The apparatus of claim 1 further comprising means for sensing the interruption of rotation of the discharge means, and means coupled to said sensing means for terminating rotation of the input means after a predetermined delay following the interruption of rotation of the discharge means.

12. A crossfeeder apparatus for serially feeding a plurality of items comprising:
   a frame assembly;
   an input shaft rotatably mounted in said assembly;
   article conveying means and drive means mounted on the input shaft;
   an output shaft having mounted thereon article exit means and drive means;
   a plurality of rotatable and pivotable shafts positioned between said input shaft and said output shaft, each having drive means, the drive means of each said plural shafts being interconnected, and the drive means of the shaft next adjacent said output shaft being interconnected to said output shaft drive means, the drive means of the shafts next adjacent said input shaft being interconnected with the drive means of said input shaft;
   guide means positioned about said shafts and related article moving means for guiding said articles between said shafts along a path defined by said guide means; and
   independent drive means effective to rotate said input shaft to provide articles to said crossfeeder, the independent drive means being responsive to the motion of said output shaft, whereby said plural shafts are capable of varying the number of articles in said crossfeeder by the rotation thereof about their pivot axes.

13. The apparatus of claim 12 wherein said input shaft is driven by said independent drive means.

14. The apparatus of claim 13 further comprising means for sensing the position of the one of said plurality of shafts next adjacent said output shaft and controlling the operation of said independent drive means.

15. The apparatus of claim 14 wherein there are a total of four shafts, including said input and said output shafts, and said four shafts are interconnected by spur gears.

16. The apparatus of claim 15 wherein said output shaft is additionally driven by article engaging means which remove the articles from the crossfeeder and positively drive the output shaft.

17. Crossfeeding apparatus for feeding items in succession from a supply source at a quasi-steady rate to a utilization device operating at an intermittent demand rate, the apparatus comprising:
a conveyor for the items coupled to be driven by the utilization device and connected to drive a plurality of rotatable shafts supporting the conveyor along a transfer path between the supply source and the utilization device, the plurality of shafts including input and output shafts fixed in position by a rigid support structure; and
a plurality of intermediate shafts pivotably supported from adjacent input and output shafts, respectively, so as to be movable in position about respective pivot axes of the input and output shafts and relative to a line between the input and output shafts in order to vary the number of items on the conveyor along the transfer path.

18. The apparatus of claim 17 further including pivoted support guides extending respectively from the input and output shafts to define the paths of the intermediate shafts in pivoting about the adjacent shafts.

19. The apparatus of claim 17 or claim 2 wherein the guides are operative to guide the items along the conveyor and define the shape of the transfer path.

20. The apparatus of claim 18 further including a plurality of gears coupling all of the shafts together.

21. The apparatus of claim 20 wherein the gear drive and the conveyor drive to the intermediate shafts co-act to determine the angular position of the intermediate shafts about their respective pivot axes.

22. The apparatus of claim 21 further including a position sensor for sensing the position of one of the intermediate shafts relative to an adjacent shaft.

23. The apparatus of claim 22 further including a drive motor coupled to drive the input shaft under the control of signals from the position sensor.

24. The apparatus of claim 23 wherein the drive motor is variable in average speed to correlate the rate of feeding items at the input shaft to the average rate of demand by the utilization device.

25. The apparatus of claim 24 further including a control unit responsive to signals from the position sensor and operative to control the activation of the motor accordingly.

26. The apparatus of claim 25 wherein the control unit is operative to activate the drive motor when the transfer path is within a preselected minimum deviation from a straight line between the input and the output shafts.

27. The apparatus of claim 25 wherein the control unit is operative to deactivate the drive motor when the transfer path is outside a preselected maximum deviation from a straight line between the input and the output shafts.

28. The apparatus of claim 17 wherein the items are cartridges and the utilization device is a gun for firing the cartridges and drawing succeeding cartridges one at a time from the output end of the conveyor as the gun fires.

29. The apparatus of claim 23 wherein the drive motor is reversible to back the items out of the crossfeeding apparatus conveyor for return to the supply source.

30. The apparatus of claim 23 further including a brake mechanism for stopping the motor when the motor is deactivated by the control unit.

* * * * *